(12) United States Patent
Luo et al.

(10) Patent No.: US 7,535,854 B2
(45) Date of Patent: May 19, 2009

(54) METHOD FOR ADDING DEVICES TO MANAGEMENT SYSTEM

(75) Inventors: Bing Luo, Shenzhen (CN); Jianfei Ma, Shenzhen (CN); Jiangang Tang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 481 days.

(21) Appl. No.: 11/091,913

(22) Filed: Mar. 28, 2005

(65) Prior Publication Data

US 2005/0169195 A1 Aug. 4, 2005

Related U.S. Application Data

(63) Continuation of application No. PCT/CN03/00837, filed on Sep. 29, 2003.

(30) Foreign Application Priority Data

Oct. 1, 2002 (CN) .............................. 02 1 43859

(51) Int. Cl.
*H04L 12/28* (2006.01)

(52) U.S. Cl. .................................... 370/254
(58) Field of Classification Search ................. 370/254, 370/230, 231, 235, 255
See application file for complete search history.

(56) References Cited

U.S. PATENT DOCUMENTS

| 6,170,008 B1 * | 1/2001 | Bahlmann et al. ............ 709/220 |
| 6,324,267 B1 | 11/2001 | Hraster et al. |
| 6,353,856 B1 | 3/2002 | Kanemaki |
| 6,363,065 B1 * | 3/2002 | Thornton et al. ............. 370/352 |
| 6,542,935 B1 * | 4/2003 | Ishii ........................... 709/245 |
| 2002/0036985 A1 | 3/2002 | Jonas et al. |
| 2002/0101818 A1 | 8/2002 | Teixeira |
| 2002/0141352 A1 * | 10/2002 | Fangman et al. ............. 370/254 |

(Continued)

FOREIGN PATENT DOCUMENTS

KR 2002040102 A 5/2002

(Continued)

OTHER PUBLICATIONS

R. Droms, Dynamic Host Configuration Protocol, Mar. 1997, Netwok Working Group, RFC 2131, pp. 11 and 27-28.*

(Continued)

*Primary Examiner*—Chirag G Shah
*Assistant Examiner*—Ashley L Shivers

(57) ABSTRACT

A method of device management relating to communication technology, wherein the method comprises the following steps of: the device initiatively sending a IP packet for management registration request to a management system according to address information of the management system, the request packet at least comprising the unique device identifier and IP address of the device; after the management system receiving registration request of the device, judging whether this device is legal or not according the unique device identifier, if it is, accepting the registration, otherwise rejecting. Dynamic configuration of the device can be performed through standard DHCP (Dynamic Host Configuration Protocol) procedure; encryption manner can be adopted for the IP packet for management registration request and its response packet; the device sends the management registration packets to management system at every internal; the present invention is of low maintenance cost, high efficiency, and high network management system security, avoiding illegal and forged devices from accessing.

4 Claims, 1 Drawing Sheet

U.S. PATENT DOCUMENTS

2003/0177208 A1\* 9/2003 Harvey, IV ................. 709/221

FOREIGN PATENT DOCUMENTS

WO  WO0215512 A  2/2002

OTHER PUBLICATIONS

Chakravorty R., et al.; "Architecture and implementation of a remote management framework for dynamically reconfigurable devices"; Networks, 2002; ICON 2002; 10th IEEE International Conference on Aug. 27-30, 2002; Piscataway, NJ, USA; IEEE; Aug. 27, 2002; pp. 375-380; XP010603647; ISBN: 0-7803-7533-5.

Anonymous; "Standards Proposal No. 4998, Proposed Upgrade of EIA/CEA-852 Tunneling Component Network Protocols Over Internet Protocol Channels (if approved, to be published as ANSI/EIA/CEA-852)"; EIA/TIA Standards and Drafts; Telecommunications Industry Association; Arlington, VA, US; Jun. 7, 2002; XP017000202.

David Fellows, et al.; "DOCSIS(TM) Cable Modem Technology"; IEEE Communications Magazine; IEEE Service Center; Piscataway, US; vol. 39, No. 3; Mar. 2001; pp. 202-209; XP011091447; ISSN: 0163-6804.

\* cited by examiner

METHOD FOR ADDING DEVICES TO MANAGEMENT SYSTEM

CROSS-REFERENCE TO RELATED APPLICATIONS

This application is a continuation of international application no. PCT/CN2003/000837 filed on Sep. 29, 2003. This application claims the benefit of Chinese patent application no. 02143859.5 filed on Oct. 1, 2002. The disclosures of the above applications are incorporated herein by reference.

FIELD OF THE INVENTION

The present invention relates to network management technology in communications, especially to a method for adding devices to management system.

BACKGROUND OF THE INVENTION

In NGN (Next Generation Network), there are many terminal devices at the subscriber side, such as IAD (Integrated Access Device) and intelligent terminals, being called by a joint name as subscriber-side device. These devices are distributed among enterprises or families, with the characteristic of vast extension, large quantity and based on dynamic IP. In the prior art for adding devices to network management system, there are two ways, one being manual input manner and another being SNMP (Simple Network Management Protocol) automatic discovery manner.

Thereby, as to manual input manner, devices are added to network management system by way of manually inputting IP addresses of devices.

For SNMP automatic discovery manner, the network management system sends PING packets or SNMP packets to all devices in a certain IP address segment, and then adding the found devices to network management system.

When adopting the above traditional methods to add devices to network management system for management, the following problems exist:

1) when adopting manual method, it will cost a very long time and a large amount of work to add all devices to network management system for management, and the ever-changing IP addresses need tracking, which will lead to increase of management and maintenance cost; moreover, when device quantity scale reaches a certain extent, this kind of cost will be intolerable, thus this method can hardly be operated.

2) when adopting SNMP automatic discovery method, it will cost a very long time to discover all devices with a low efficiency, and the management security is not guaranteed, thus it's probable that illegal and forged devices be added to network management system; when more illegal and forged devices are added to management system, the legal devices may be submerged, even lead to paralysis of management system.

SUMMARY OF THE INVENTION

Therefore, object of the present invention is to provide a method of device management with lower cost, higher efficiency and stronger security, in order to overcome the disadvantages of the prior art in terms of adding devices to management system.

The scheme of the invention is as follows.

A method for adding devices to management system comprising:

A) the device at subscriber sides initiatively sending an IP packet for management registration request to the management system according to the address information of the management system, wherein the IP packet for management registration request at least includes an unique device identifier;

B) after receiving the IP packet for management registration request, the management system judging whether the device is legal according to the unique device identifier, if it is, accepting the IP packet for management registration request, otherwise, rejecting the IP packet for management registration request.

Wherein the said step A further comprising, at every interval sending the IP packet for management registration request to management system.

Wherein the said step B further comprising, if the device being judged as legal, recording the IP address and port number in the received IP packet for management registration request, and sending a management registration acceptance packet to the device.

Wherein the said step B further comprising, if the device being judged as illegal, sending a management registration rejection packet to the device and ending management registration.

The method further comprising:

C) if the device must load a configuration file, sending a requesting packet for loading configuration file to the management system, wherein the requesting packet carries the unique device identifier;

the management system judging whether there is information corresponding to the configuration file, if it is, returning back an answering packet of loading configuration file, wherein the answering packet carries an IP address and configuration file name of a TFTP (Trivial File Transfer Protocol) server, then carrying out step D; otherwise returning back a rejection packet of load configuration file;

D) after receiving the answering packet of loading configuration file, the device sending a request for downloading configuration file to TFTP server;

the TFTP server responding to the request and providing the configuration file for initialization.

The benefiting effect of the present invention is: in the present invention, the device initiatively sends IP packet for management registration request to management system, management system judges the validity of the device according to the unique device identifier, in this way, manual intervention of device management is avoided, with lower management and maintenance cost and higher efficiency; moreover, through verification by the unique device identifier, the access of illegal and forged devices is avoided, thus enhancing security of network management system; encryption manner is adopted for the IP packet for management registration request and answering packet, thus also enhancing system security; the device initiatively sends management registration packets to management system at every interval, avoiding loss of IP address and port information of the device after restarting, thus improving working reliability.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
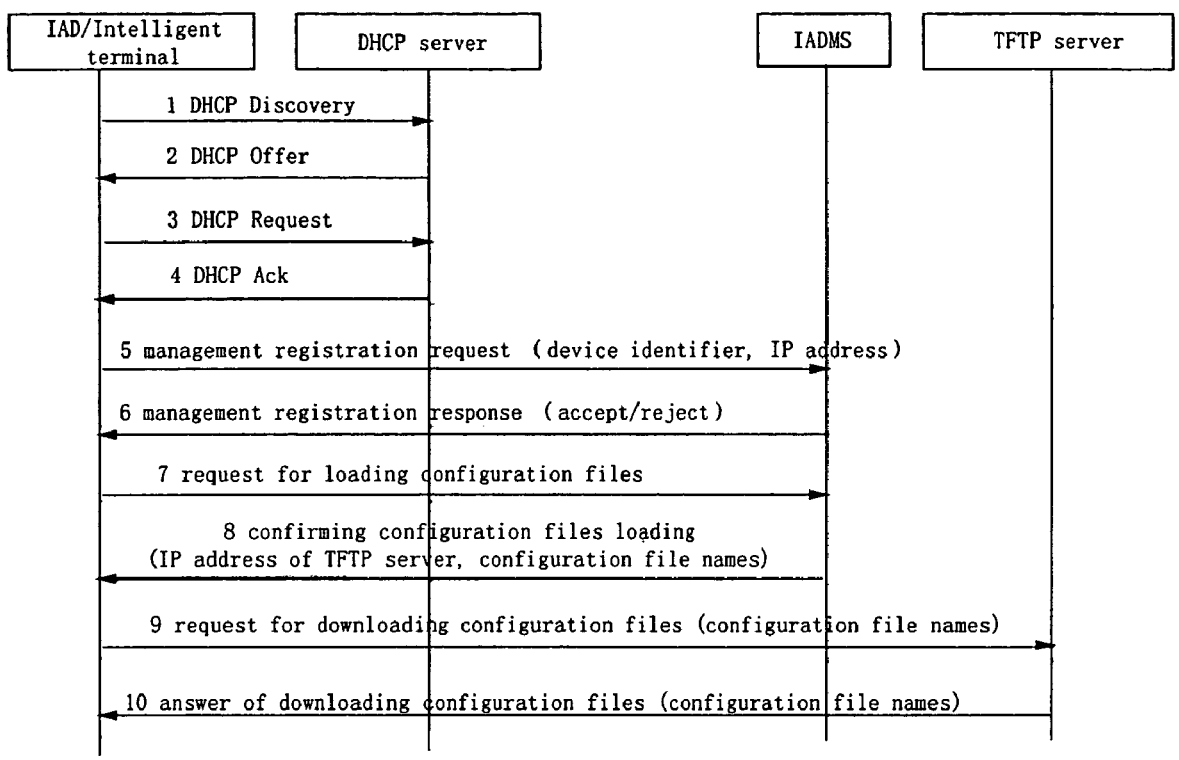
FIG. 1 is the sketch map for adding devices to network management system in terms of the present invention.

The following description of the preferred embodiment(s) is merely exemplary in nature and is in no way intended to limit the invention, its application, or uses.

Now, the present invention will be described in detail with reference to the accompanying drawings and embodiment, taking example of adding management of Integrated Access Device.

According to FIG. 1, when adding devices to management system, the following steps are adopted: the Integrated Access Device initiatively sending the IP packet for management registration request to IADMS (IAD Management System) according to the address information of the IADMS, wherein the IP packet for management registration request packet at least comprises unique device identifier and IP address of the Integrated Access Device; after receiving the IP packet for management registration request of Integrated Access Device, IAD Management System judging whether the Integrated Access Device is legal according to the unique device identifier, if it is, registration being accepted, otherwise rejected.

Here, with reference to the dynamic configuration course of an Integrated Access Device based on standard DHCP (Dynamic Host Configuration Protocol), the course of adding the Integrated Access Device to IAD Management System for management is described in detail, as is shown in FIG. 1:

Step 1, after Integrated Access Device is switched on, judging whether IP address needs to be distributed, if it is, Integrated Access Device initiating DHCP, then broadcasting DHCP Discovery packets to the outside.

Step 2, after receiving DHCP Discovery packet, DHCP server returning DHCP Offer packet, the returned information including: IP address, subnet mask, gateway address and DNS server address.

Step 3, after Integrated Access Device receiving DHCP Offer packet, if the distributed IP address is accepted, DHCP Request packet will be sent to DHCP server.

Step 4, DHCP server sending DHCP Ack packet to Integrated Access Device. The above four steps form the standard IP address dynamic distribution course, actually, if Integrated Access Device of DHCP is not initiated, turning to step 5 directly.

Step 5, Integrated Access Device initiatively sending the IP packet for management registration request to IAD Management System according to the address information of IAD Management System, wherein the IP packet for management registration request comprises the unique device identifier and IP address of the Integrated Access Device.

Step 6, after receiving the IP packet for management registration request of Integrated Access Device, IAD Management System judging whether the Integrated Access Device is legal according to the unique device identifier, if it is, the registration is accepted, the IAD Management System recording the IP address and port number from which the IP packet for management registration request comes, and sending management registration acceptance packet to Integrated Access Device; otherwise, the registration is rejected, IAD Management System sending the IP packet for management registration request to Integrated Access Device, and then ending the management registration.

Step 7, if the said Integrated Access Device must load configuration files, the request packet of loading configuration files is sent to IAD Management System, wherein the packet carries the unique device identifier; if no configuration files need to load, ending this management registration flow.

Step 8, if information corresponding to the configuration file is already stored in IAD Management System, answering packet of loading configuration files is returned by IAD Management System, wherein the answering packet comprises: TFTP (Typical File Transfer Protocol) server address and configuration file names; otherwise a rejection packet will be returned by IAD Management System to reject the request for loading configuration files.

Step 9, after receiving the answering packet of loading configuration files, Integrated Access Device sending request for downloading configuration files to TFTP server, wherein this request carries the required configuration file names.

Step 10, TFTP server responding to the request and providing configuration files for initialization to Integrated Access Device. In this way, Integrated Access Device can be configured according to the received configuration files.

In the above IAD Management System, the method is applicable not only for Integrated Access Devices, but also for intelligent terminals. In the said steps, encryption manner can be adopted for the concerned IP packet for management registration request and its response packet, moreover, after Integrated Access Device is started up, Integrated Access Device initiatively sends management registration packets to IAD Management System at every interval, thus preventing loss of IP address and port information of Integrated Access Device when IAD Management System is restarted, as to the returned packets from IAD Management System, there can be no subsequent process, nor be error process performed by Integrated Access Device.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for adding an IAD, Integrated Access Device, to an IADMS, Integrated Access Device Management System, comprising:

A) an IAD at a subscriber side acquiring an IP address distributed by a DHCP, Dynamic Host Configuration Protocol, server, and initiatively sending an IP packet for management registration request to the IADMS according to an address information of the IADMS, the IP packet for management registration request including an unique device identifier and the IP address distributed by the DHCP server; and B) after receiving the IP packet for management registration request, the IADMS determining whether the IAD is legal according to the unique device identifier, if the IAD is legal, the IADMS accepting the IP packet for management registration request, recording the IP address included in the received IP packet for management registration request and the port number from which the IP packet for management registration request is sent, sending a management registration acceptance packet to the IAD, and adding the IAD to the IADMS, and if the IAD is not legal, the IADMS rejecting the IP packet for management registration request; and, C) if the IAD must load a configuration file, sending a requesting packet for loading the configuration file to the IADMS, the requesting packet carrying the unique device identifier; and the IADMS judging whether there is information corresponding to the configuration file, if it is judged that there is the information corresponding to the configuration file, the IADMS sending back an answering packet of loading the configuration file, the answering packet carrying an IP address of a TFTP, Trivial File Transfer Protocol, server and a name of the configuration file, the IAD sending a request for downloading the configuration file to the TFTP server after receiving the answering packet of loading the configuration file; and the TFTP server responding to the request and providing the configuration file for initialization; and if it is judged that there is no information corresponding to the configuration file, the IADMS sending back a rejection packet of loading the configuration file.

2. The method according to claim 1, said step B further comprising, if the IAD being determined as illegal, the IADMS sending a management registration rejection packet to the IAD and ending management registration.

3. A method for adding an IAD, Integrated Access Device, to an IADMS, Integrated Access Device Management System, comprising:

an IAD acquiring an IP address distributed by a DHCP, Dynamic Host Configuration Protocol, server, and initiatively sending an IP packet for management registration request to the IADMS according to address information of the IADMS, the IP packet for management registration request including an unique device identifier and the IP address distributed by the DHCP server, the IADMS determining whether the IAD is legal according to the unique device identifier after receiving the IP packet for management registration request, and if the IAD is legal, the IADMS accepting the IP packet for management registration request, recording the IP address distributed by the DHCP server included in the received IP packet for management registration request and the port number from which the IP packet for management registration request is sent, sending a management registration acceptance packet to the IAD, and adding the IAD to the IADMS, and if the IAD must load a configuration file, the method further comprising:

the IAD sending a requesting packet for loading a configuration file to the IADMS, the requesting packet carrying the unique device identifier, and the IADMS judging whether there is information corresponding to the configuration file, and if it is judged that there is the information corresponding to the configuration file, the IADMS sending back an answering packet of loading the configuration file, the answering packet carrying an IP address of a TFTP, Trivial File Transfer Protocol, server and a name of the configuration file, the IAD sending a request for downloading the configuration file to the TFTP server after receiving the answering packet of loading the configuration file, and the TFTP server responding to the request and providing the configuration file for initialization.

4. A system for adding an IAD, Integrated Access Device, to an IADMS, Integrated Access Device Management System, at least comprising:

an IAD an IADMS, a DHCP Dynamic Host Configuration Protocol, server and a TFTP, Trivial File Transfer Protocol, server, the IAD acquiring an IP address distributed by the DHCP server, and initiatively sending an IP packet for management registration request to the IADMS according to address information of the IADMS, the IP packet for management registration request including an unique device identifier and the IP address distributed by the DHCP server, the IADMS determining whether the IAD is legal according to the unique device identifier after receiving the IP packet for management registration request, and if the IAD is legal, accepting the IP packet for management registration request, recording the IP address distributed by the DHCP server included in the received IP packet for management registration request and the port number from which the IP packet for management registration request is sent, sending a management registration acceptance packet to the IAD, and adding the IAD to the IADMS, the IAD further sending a requesting packet for loading a configuration file to the IADMS if the IAD must load a configuration file, the requesting packet carrying the unique device identifier, and sending a request for downloading the configuration file to the TFTP server after receiving an answering packet of loading the configuration file, the IADMS further judging whether there is information corresponding to the configuration file upon receiving the requesting packet for loading the configuration file, and sending back the answering packet of loading the configuration file if it is judged that there is the information corresponding to the configuration file, the answering packet carrying an IP address of the TFTP server and a name of the configuration file, and the TFTP server responding to the request for downloading the configuration file and providing the configuration file for initialization.

* * * * *